March 11, 1924.
A. J. WELLS
TWO-PIECE PACKING GLAND
Filed Jan. 20, 1921
1,486,708
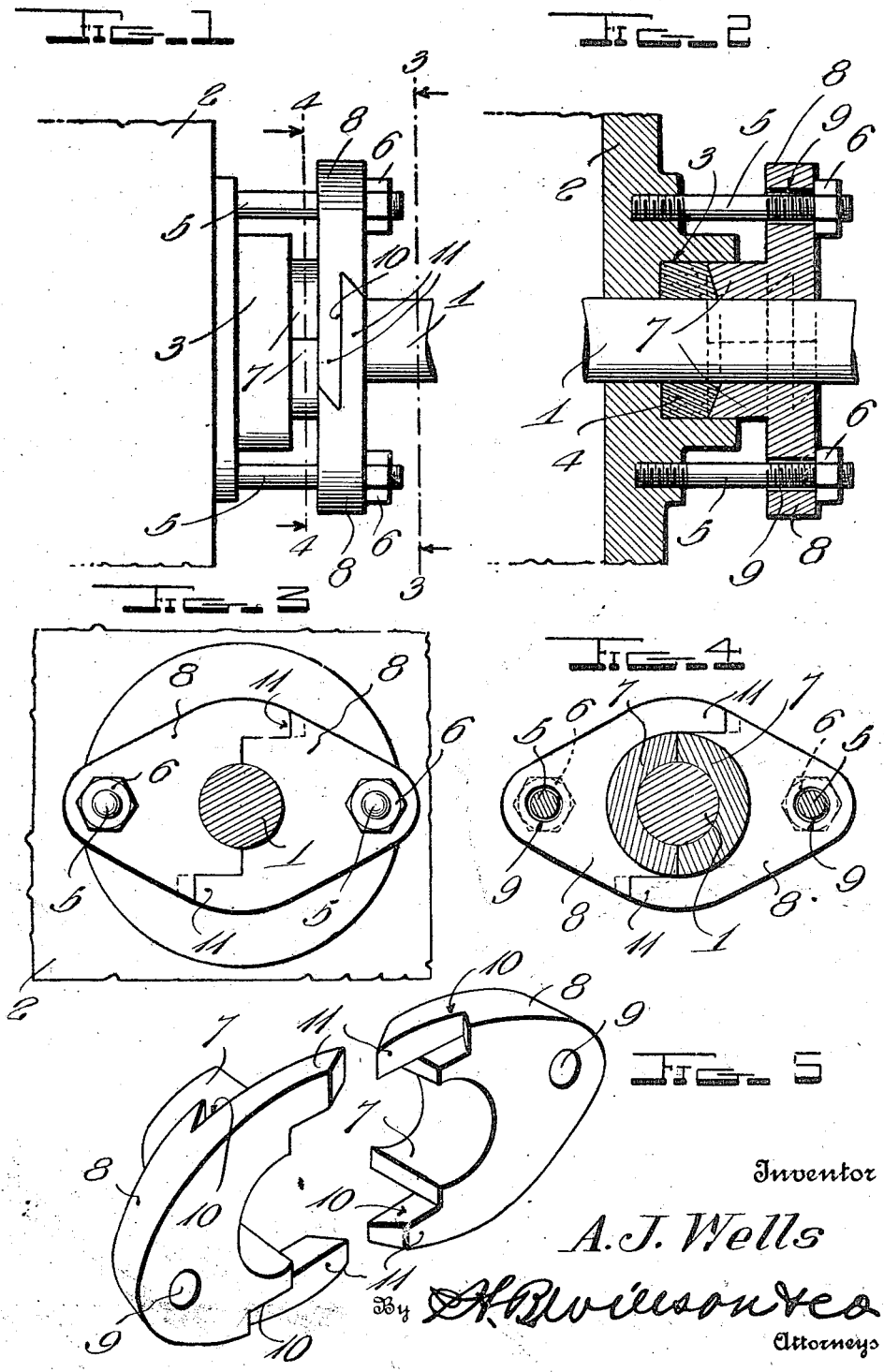

Patented Mar. 11, 1924.

1,486,708

UNITED STATES PATENT OFFICE.

ANDERSON J. WELLS, OF SOUTH GREENSBURG, PENNSYLVANIA.

TWO-PIECE PACKING GLAND.

Application filed January 20, 1921. Serial No. 438,766.

*To all whom it may concern:*

Be it known that I, ANDERSON J. WELLS, a citizen of the United States, residing at South Greensburg, in the county of Westmoreland and State of Pennsylvania, have invented certain new and useful Improvements in Two-Piece Packing Glands; and I do declare the following to be a full, clear, and exact description of the invention, such as will enable others skilled in the art to which it appertains to make and use the same.

This invention relates to an improved packing gland and one object of the invention is to provide a gland which may be formed in two sections so that a broken packing may be easily removed and a new one put in place about a shaft, the sections of the packing gland being so constructed that they will be held against transverse movement and against side play.

Another object of the invention is to so construct this packing gland that the two sections may be easily and quickly put together and when connected prevented from having independent movement longitudinally of the shaft as well as being held against transverse or twisting movement.

Another object of the invention is to so construct this packing gland that each section may be formed in a single casting and thus a gland provided which will be very simple in construction and strong and durable and further cheap to produce.

This invention is illustrated in the accompanying drawings, wherein:

Figure 1 is a view showing the improved packing gland in use.

Figure 2 is a longitudinal sectional view through the structure shown in Fig. 1, the shaft being shown in elevation.

Figure 3 is a transverse sectional view taken along the line 3—3 of Fig. 1.

Figure 4 is a transverse sectional view taken along the line 4—4 of Fig. 1.

Figure 5 is a perspective view showing the two sections of the packing gland separated.

In the present illustration, the improved packing gland has been shown in place about the shaft 1 of a pump, the pump shaft extending through a cylinder head 2 having a packing box 3 provided therein so that the packing 4 may be placed about the pump shaft. The usual stud pins 5 which may be termed bolts have been provided and these stud pins or bolts 5 carry securing nuts 6 so that the packing gland may be drawn tightly into place.

The packing gland is formed into two separable sections as shown in Fig. 5, the sections being of duplicate construction and each having a neck portion 7 and a base portion 8. The necks formed when these two sections are put together, will extend into the packing housing 3 and will engage the packing 4 to tightly compress this packing about the shaft 1 in the usual manner. The base portions extend beyond the packing housing and each base portion is provided with an opening 9 through which will pass the stems or bolts 5. After the stems or bolts have been passed through these openings, the securing nuts will be put in place and tightened and the packing gland will be drawn toward the cylinder head in the usual manner. Each of the end sections of the packing gland will have the side portion of its base cut to provide seats 10 and tongue extensions 11, the seats having their inner ends undercut as clearly shown, and the tongues having their ends bevelled so that the bevelled ends of the tongues will fit into the undercut end portions of the seats and prevent the two sections of the packing gland from having independent movement longitudinally of the shaft. It should be further noted that in forming a section of the packing gland, one of the seats and tongue extensions will be formed by cutting the base from one face and the seat and tongue at the opposite side of the base will be formed by cutting this base from its second face. Therefore, each section of the gland will be provided at one side with what may be termed an inner tongue and at the second side with what may be termed an outer tongue, the inner tongue of one section fitting into a corresponding seat of the second section and the outer tongue of the first section fitting into a corresponding seat of the second section. When a gland is to be replaced, it is simply necessary to remove the nuts and after putting a new gland in place, replace and tighten the nuts.

I claim:

A packing gland comprising duplicate separable sections each having a sleeve forming portion and a collar forming portion at the outer end of its sleeve forming portion, the collar forming portions having extended outer end portions having openings for receiving fasteners to hold the gland in place about a shaft, and tongues extending longitudinally from the inner end of each collar forming portion at opposite sides of the sleeve portion and extending beyond the sleeve forming portion and having beveled ends with the end of the tongue at one side of the sleeve portion beveled in an opposite direction to the end of the tongue at the opposite side of the sleeve, the collar forming portion having recesses extending longitudinally of the collar from the inner ends of the tongues and under cut at their inner ends and adapted to receive the tongues of the other section when the sections are put together with the edges of the sleeve forming portions contacting and the tongues extending in overlapping relation.

In testimony whereof I have hereunto set my hand.

ANDERSON J. WELLS.